(12) United States Patent
Yang

(10) Patent No.: US 11,375,435 B2
(45) Date of Patent: Jun. 28, 2022

(54) DEVICE-TO-DEVICE SERVICE RESTRICTION METHOD AND STORAGE MEDIUM

(71) Applicant: ZTE CORPORATION, Guangdong (CN)

(72) Inventor: Haicheng Yang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/272,940

(22) PCT Filed: Aug. 22, 2019

(86) PCT No.: PCT/CN2019/101879
§ 371 (c)(1),
(2) Date: Mar. 3, 2021

(87) PCT Pub. No.: WO2020/048317
PCT Pub. Date: Mar. 12, 2020

(65) Prior Publication Data
US 2021/0282071 A1 Sep. 9, 2021

(30) Foreign Application Priority Data

Sep. 3, 2018 (CN) .......................... 201811023395.1

(51) Int. Cl.
*H04W 48/02* (2009.01)
*H04W 12/06* (2021.01)
*H04W 12/08* (2021.01)

(52) U.S. Cl.
CPC .......... *H04W 48/02* (2013.01); *H04W 12/06* (2013.01); *H04W 12/08* (2013.01)

(58) Field of Classification Search
CPC ..... H04W 48/02; H04W 12/06; H04W 12/08; H04W 8/005; H04W 48/14; H04W 4/70; H04W 4/50
See application file for complete search history.

(56) References Cited

U.S. PATENT DOCUMENTS

| | | | |
|---|---|---|---|
| 2015/0063260 A1* | 3/2015 | Kuo ...................... | H04W 8/005 370/329 |
| 2016/0212653 A1 | 7/2016 | Wang et al. | |

FOREIGN PATENT DOCUMENTS

| | | |
|---|---|---|
| CN | 101321081 A | 12/2008 |
| CN | 101765241 A | 6/2010 |

(Continued)

OTHER PUBLICATIONS

ZTE Corporation, International Search Report, PCT/CN2019/101879, dated Oct. 29, 2019, 4 pgs.

(Continued)

*Primary Examiner* — Brandon J Miller
(74) *Attorney, Agent, or Firm* — USCH Law, PC

(57) ABSTRACT

The present disclosure provides a device-to-device service restriction method and a computer readable storage medium. The method includes: receiving a service restriction instruction sent by a second terminal; obtaining access class information of the second terminal; determining whether a service restriction authority of the second terminal is correct according to the access class information; restricting a function of an application program of a first terminal according to the service restriction instruction in response to that the service restriction authority is correct. In certain embodiments of the present disclosure, a function of the first terminal is restricted by using the service restriction. In a scenario where a service of a terminal needs to be restricted, the information security of a security zone is guaranteed and user experience is improved.

13 Claims, 2 Drawing Sheets

(56) References Cited

FOREIGN PATENT DOCUMENTS

| | | | |
|---|---|---|---|
| CN | 101867896 A | 10/2010 | |
| CN | 101540980 B | 3/2012 | |
| CN | 103797760 A | 5/2014 | |
| CN | 105992275 A | 10/2016 | |
| CN | 106982293 A | 7/2017 | |
| CN | 109756871 A | 5/2019 | |
| EP | 1837794 A2 | 9/2007 | |
| EP | 3082345 A1 | 10/2016 | |
| EP | 3182762 A1 * | 6/2017 | ............. H04W 4/80 |
| WO | 2006135907 A1 | 12/2006 | |
| WO | 2011143969 A1 | 11/2011 | |
| WO | WO-2015051844 A1 * | 4/2015 | ............ H04W 12/04 |

OTHER PUBLICATIONS

ZTE Corporation, CN First Office Action, CN201811023395.1, dated Feb. 23, 2021, 6 pgs.
ZTE Corporation, Extended European Search Report, EP19858104.3, dated Sep. 1, 2021,10 pgs.

* cited by examiner

DEVICE-TO-DEVICE SERVICE RESTRICTION METHOD AND STORAGE MEDIUM

CROSS REFERENCE TO RELATED APPLICATIONS

The present application is a United States National Stage Application filed under 35 U.S.C. § 371 of PCT Patent Application Serial No. PCT/CN2019/101879, filed Aug. 22, 2019, which claims priority to Chinese Patent Application No. CN201811023395.1, entitled "DEVICE-TO-DEVICE SERVICE RESTRICTION METHOD, TERMINAL AND STORAGE MEDIUM," filed Sep. 3, 2018, each of which is incorporated by reference herein in its entirety.

TECHNICAL FIELD

The present disclosure relates to the field of communication technologies, and in particular to a device-to-device service restriction method and a computer-readable storage medium.

BACKGROUND

Along with development of wireless multimedia services, people have an increasing demand for high data rate and user experiences, which increases the requirements for system capacity and coverage of a traditional cellular network. On the other hand, with the popularity of applications such as social network, short-range data sharing, and local advertising, people have a gradually-increasing demand for knowing nearby interesting person or object and communicating with it (referred to as Proximity Service, ProSe). There is obvious limitation with a traditional cell-based cellular network in support of high data rate service and proximity service. In such demand, a device-to-device (D2D) communication technology representing a new development of future communication technology emerges. The application of the D2D technology can reduce the burden of the cellular network, lower batter power consumption of a user device, increase data transmission rate and improve the robustness of network infrastructure, thereby better satisfying the requirements of the high data rate service and the proximity service.

During the implementation of the present disclosure, the inventor finds that the following problems in some cases. In a scenario where a service of a terminal needs to be restricted, a huge potential security hazard may easily occur due to lack of security confidentiality awareness in a terminal user while high cost and low efficiency may be caused in a case of manual restrictions, resulting in inability to satisfy security requirements.

SUMMARY

In view of this, some embodiments of the present disclosure are intended to provide a device-to-device service restriction method and a computer readable storage medium so as to solve the problem that potential security hazards are easily caused and security requirements cannot be satisfied where a service of a terminal needs to be restricted.

In order to solve the above technical problem, certain embodiments of the present disclosure adopt the following technical solution. According to an aspect of certain embodiments of the present disclosure, provided is a device-to-device service restriction method. The method is applicable to a first terminal and includes: receiving a service restriction instruction sent by a second terminal; obtaining access class information of the second terminal when receiving the service restriction instruction sent by the second terminal; determining whether a service restriction authority of the second terminal is correct according to the access class information of the second terminal; restricting a function of the first terminal according to the service restriction instruction sent by the second terminal in response to that the service restriction authority of the second terminal is correct.

According to another aspect of certain embodiments of the present disclosure, provided is a first terminal. The first terminal includes a memory, a processor and a device-to-device service restriction program stored on the memory and run on the processor, where the device-to-device service restriction program is executed by the processor to perform the steps in the above device-to-device service restriction method. According to another aspect of certain embodiments of the present disclosure, provided is a device-to-device service restriction method. The method is applicable to a second terminal and includes the following: sending a service restriction instruction to a first terminal; sending access class information to the first terminal, responsive to that the first terminal receives the service restriction instruction; so that the first terminal determines whether a service restriction authority of the second terminal is correct according to the access class information, and restricts a function corresponding to the first terminal according to the service restriction instruction when the service restriction authority of the second terminal is correct.

According to another aspect of certain embodiments of the present disclosure, provided is a second terminal. The second terminal includes a memory, a processor and a device-to-device service restriction program stored on the memory and run on the processor, where the device-to-device service restriction program is executed by the processor to perform the steps in the above device-to-device service restriction method.

According to another aspect of certain embodiments of the present disclosure, provided is a computer readable storage medium. The computer readable storage medium stores a device-to-device service restriction program which is executed by a processor to perform the steps in the above device-to-device service restriction method.

In a device-to-device service restriction method, a terminal and a computer readable storage medium of the embodiments of the present disclosure, a function corresponding to the first terminal may be restricted according to the service restriction instruction sent by the second terminal. In a scenario where a service of a terminal needs to be restricted, information security of a security zone is guaranteed and user experience is improved.

The realization of object, functional features and advantages of the present disclosure will be further described with reference to specific embodiments and accompanying drawings.

DETAILED DESCRIPTION OF THE EMBODIMENTS

In order to describe the technical problems, technical solutions and the beneficial effects of the present disclosure more clearly, the present disclosure will be further described in detail in combination with accompanying drawings and embodiments. It should be understood that the specific embodiments described herein are used only to explain the present disclosure rather than limit the present disclosure.

EXAMPLE I

Figure 1:
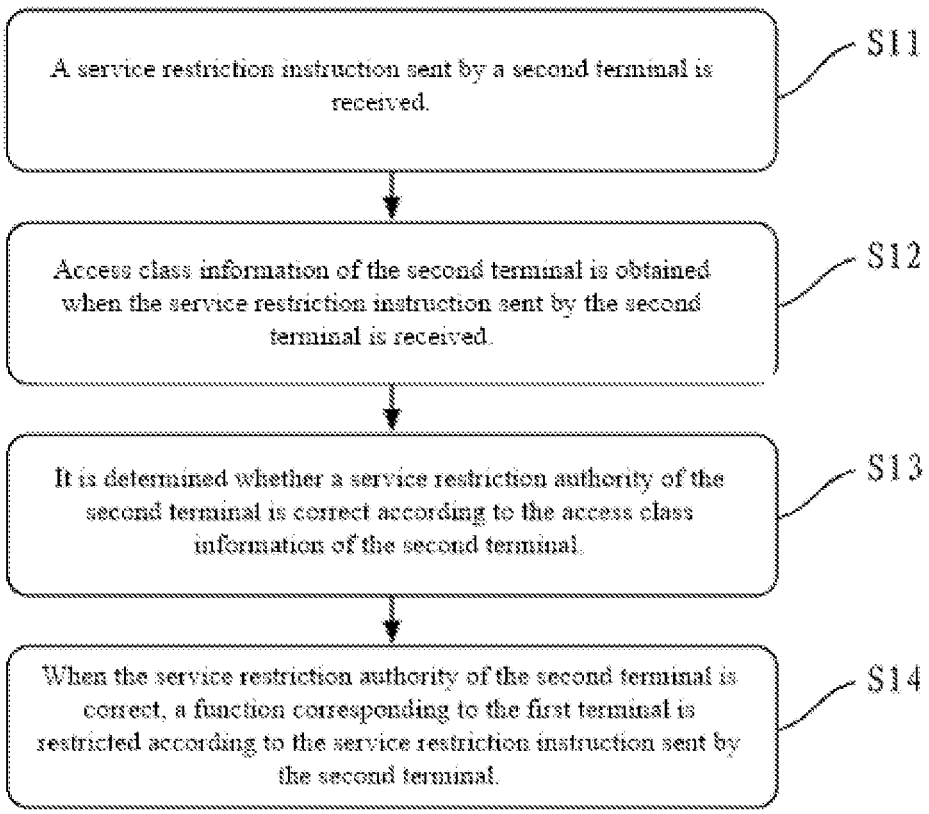
FIG. 1 is a flowchart of a device-to-device service restriction method according to a certain embodiments of the present disclosure.

As shown in FIG. 1, certain embodiments of the present disclosure provides a device-to-device service restriction method, which is applicable to a first terminal. The first terminal includes but not limited to mobile phone, smart phone, laptop computer, digital broadcast receiver, personal digital assistant (PDA), tablet computer (PAD), portable multimedia player (PMP), and navigation device and the like. It is noted that "first" and "second" herein are used for the purpose of description only and shall not be understood as indicating or implying its relative importance or implicitly indicating the number of the indicated technical features.

The method includes the following steps.

At step S11, a service restriction instruction sent by a second terminal is received.

In certain embodiments, during the discovery process of D2D, if the first terminal discovers the second terminal, the first terminal may receive and analyze the service instruction sent by the second terminal. The service instruction contains a service restriction requirement of the second terminal for the first terminal For example, the service restriction requirement may be a request for the first terminal to disable a camera and recording authority, which is not limited herein.

At step S12, access class information of the second terminal is obtained when the service restriction instruction sent by the second terminal is received.

In certain embodiments, the access class information is usually stored in an EFACC file on a Subscriber Identification Module (SIM) card. The EFACC file is an Access Control Class (ACC) file. The access class information may be modified by an operator through Over the Air (OTA).

The specification of the 3rd Generation Partnership Project (3GPP) states as follows.

1. Access classes 0-9 are of ordinary priority, and access classes 11-15 are of high priority. A reference may be made to the following.

| | |
|---|---|
| Classes 0-9 | Ordinary priority |
| Class 11 | Used for management of Public Land Mobile Network (PLMN) and the like |
| Class 12 | Security department application |
| Class 13 | Public utility department (such as water, gas and so on) |
| Class 14 | Emergency services |
| Class 15 | PLMN staff |

2. On each SIM card, there is only one access class 0-9 but more than one class 11-15.

3. The ordinary priority is only included in the access classes 0-9.

In certain embodiments, the method of obtaining the access class information of the second terminal includes the followings.

An access class information reading request is sent to the second terminal.

When an identity authentication request sent by the second terminal is received, an identifier is sent to the second terminal so that the second terminal performs authorization check for the first terminal on a server according to the identifier.

The access class information returned by the second terminal is received.

Figure 5:
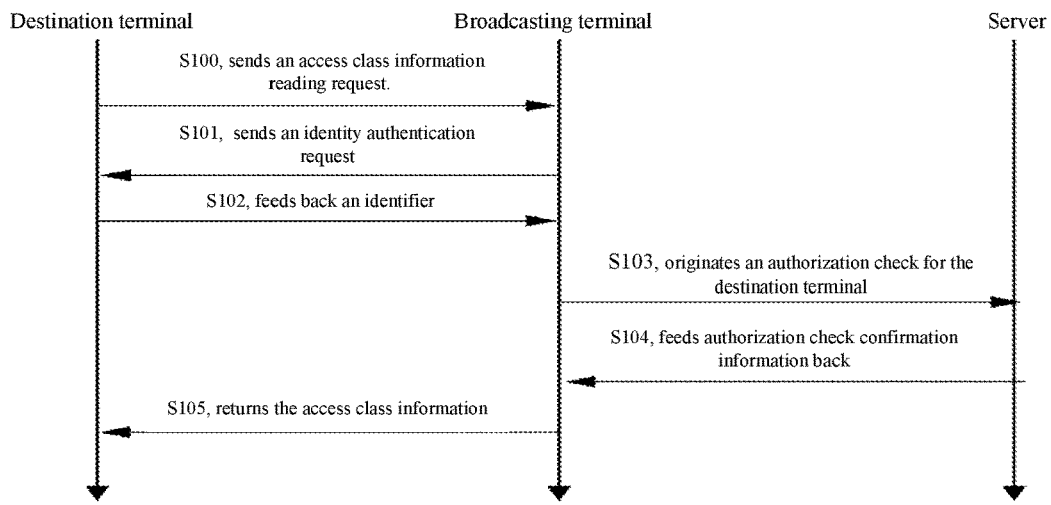
FIG. 5 is a structural schematic diagram of a time sequence of obtaining access class information of a second terminal according to an embodiment of the present disclosure.

In order to better describe the process in which the first terminal obtains the access class information of the second terminal, the following descriptions are made with the first terminal as a destination terminal and the second terminal as a broadcasting terminal in combination with FIG. 5.

The destination terminal obtains the access class information of the broadcasting terminal, which includes the following steps.

At step S100, the destination terminal sends an access class information reading request to the broadcasting terminal.

At step S101, the broadcasting terminal sends an identity authentication request to the destination terminal after receiving the access class information reading request.

At step S102, the destination terminal feeds an identifier (ID) of the destination terminal back to the broadcasting terminal after receiving the identity authentication request.

At step S103, the broadcasting terminal initiates an authorization check for the destination terminal to a server after receiving the identifier fed back by the destination terminal.

At step S104, if the destination terminal is already authorized, the server feeds authorization check confirmation information back to the broadcasting terminal.

At step S105, the broadcasting terminal returns the access class information to the destination terminal after receiving the authorization check confirmation information fed back by the server.

At step S13, it is determined whether a service restriction authority of the second terminal is correct according to the access class information of the second terminal.

In certain embodiments, whether the service restriction authority of the second terminal is correct is determined according to the access class information of the second terminal includes the following steps.

When the access class information of the second terminal includes at least one of access class information of high priority, whether the service restriction authority of the second terminal is correct is determined.

In certain embodiments, a terminal with an access class of high priority may send a service restriction instruction. Such a terminal may be referred to as "D2D infrastructure" in D2D communication. The access class of the D2D infrastructure may be pre-agreed, for example, as class 12 (security department application), or may be designated as any one or more of the high priorities 11-15.

At step S14, when the service restriction authority of the second terminal is correct, a function corresponding to the first terminal is restricted according to the service restriction instruction sent by the second terminal.

As an example, if a terminal B requires a terminal A to disable a camera authority and a recording authority, the terminal A receives the service restriction instruction sent by the terminal B. The terminal A may disable the authorities of android.permission.CAMERA and android.permission.RECORD_AUDIO of an application program sequentially. Also the terminal A may gray the above authorities in management interface of an application program in a setup menu to disable users from enabling the authorities manually. At the end of D2D communication, the camera and recording authorities of the terminal A are turned to be restored.

In order to better describe the service restriction process of D2D, the following descriptions are made with two D2D devices (terminal A and terminal B) as single cards in one-to-one D2D communication, where the terminal B requires the terminal A to disable the camera and recording authorities in this application scenario.

In a D2D discovery process, the terminal A discovers the terminal B.

The terminal A receives and analyzes the service restriction instruction of the terminal B and then reads the access class information of the terminal B. After that, the terminal A determines whether the service restriction authority of the terminal B is correct. In response to that the service restriction authority of the terminal B is determined to be correct, the terminal A disables the authorities of android.permission.CAMERA and android.permission.RECORD_AUDIO of an application program sequentially. And the terminal A grays the above authorities in management interface of an application program in a setup menu to disable users from enabling the authorities manually. At the end of D2D communication, the camera authority and recording authority of the terminal A are restored.

In the device-to-device service restriction method of the embodiments of the present disclosure, the function corresponding to the first terminal is restricted according to the service restriction instruction sent by the second terminal. In a scenario where a service of a terminal needs to be restricted, information security of a security zone is guaranteed and user experiences are improved.

EXAMPLE II

Figure 2:
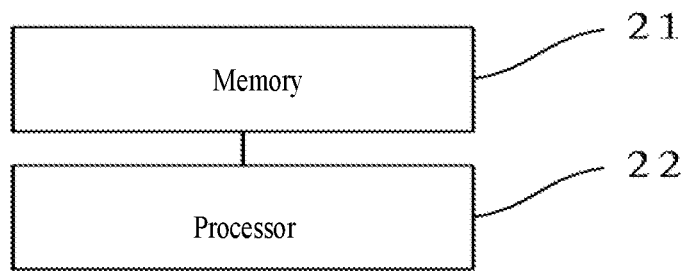
FIG. 2 is a structural schematic diagram of a first terminal according to a certain embodiments of the present disclosure.

As shown in FIG. 2, certain embodiments of the present disclosure provide a first terminal. The first terminal includes a memory 21, a processor 22 and a device-to-device service restriction program stored on the memory 21 and run on the processor 22. The device-to-device service restriction program is executed by the processor 22 to perform the steps in the following device-to-device service restriction method.

A service restriction instruction sent by a second terminal is received.

Access class information of the second terminal is obtained in response to receiving the service restriction instruction.

Whether a service restriction authority of the second terminal is correct is determined according to the access class information of the second terminal.

When the service restriction authority of the second terminal is correct, a function corresponding to the first terminal is restricted according to the service restriction instruction of the second terminal.

The device-to-device service restriction program may also be executed to perform the steps, in the following device-to-device service restriction method, by the processor 22.

An access class information reading request is sent to the second terminal.

When an identify authentication request sent by the second terminal is received, an identifier is sent to the second terminal so that the second terminal performs authorization check for the first terminal on a server according to the identifier.

The access class information returned by the second terminal is received.

The device-to-device service restriction program may also be executed to perform the steps, in the following device-to-device service restriction method, by the processor 22.

When the access class information of the second terminal includes at least one access class information of high priority, whether the service restriction authority of the second terminal is correct is determined.

In the embodiment of the present disclosure, the first terminal restricts a function corresponding itself according to the service restriction instruction sent by the second terminal. In a scenario where a service of a terminal needs to be restricted, information security of a security zone is guaranteed and user experiences are improved.

EXAMPLE III

Figure 3:
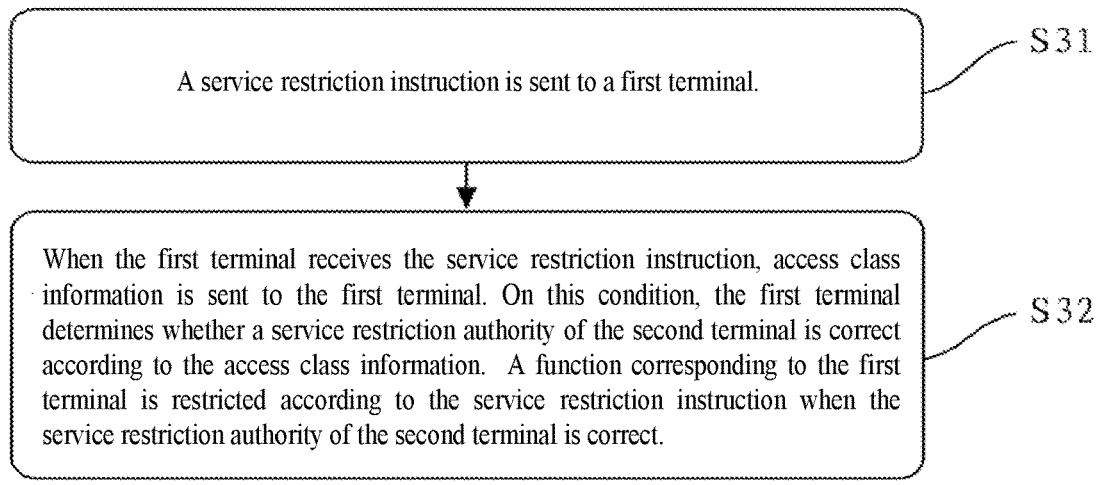
FIG. 3 is a flowchart of a device-to-device service restriction method according to a certain embodiments of the present disclosure.

As shown in FIG. 3, certain embodiments of the present disclosure provides a device-to-device service restriction method applicable to a second terminal. The second terminal includes but not limited to mobile phone, smart phone, laptop computer, digital broadcast receiver, personal digital assistant (PDA), tablet computer (PAD), portable multimedia player (PMP) and navigation device and the like. The method includes the following steps S31 and S32.

At step S31, a service restriction instruction is sent to a first terminal.

In certain embodiments, in a D2D discovery process, if the first terminal discovers the second terminal, the first terminal receives and analyzes a service instruction sent by the second terminal. The service instruction contains a service restriction requirement of the second terminal for the first terminal. For example, the service instruction contains a request of the second terminal for the first terminal to disable a camera authority and a recording authority, which is not limited herein.

At step S32, when the first terminal receives the service restriction instruction, access class information is sent to the first terminal. On this condition, the first terminal determines whether a service restriction authority of the second terminal is correct according to the access class information. A function corresponding to the first terminal is restricted according to the service restriction instruction when the service restriction authority of the second terminal is correct.

In certain embodiments, the access class information is usually stored in an EFACC file on a Subscriber Identification Module (SIM) card. The EFACC file is an Access Control Class (ACC) file. The access class may be modified by an operator through Over the Air (OTA).

The specification of the 3rd Generation Partnership Project (3GPP) states as follows:

1. Access classes 0-9 are of ordinary priority, and access classes 11-15 are of high priority. A reference may be made to the following.

| | |
|---|---|
| Classes 0-9 | Ordinary priority |
| Class 11 | Used for management of Public Land Mobile Network (PLMN) and the like |

-continued

| | |
|---|---|
| Class 12 | Security department application |
| Class 13 | Public utility department (such as water, gas and so on) |
| Class 14 | Emergency services |
| Class 15 | PLMN staff |

2. On each SIM card, there is only one access class 0-9 but more than one class 11-15.

3. The ordinary priority is only contained in the access classes 0-9.

In certain embodiments, the method of sending the access class information to the first terminal includes the followings.

An access class information reading request, sent by the first terminal, is received.

An identity authentication request is sent to the first terminal when receiving the access class information reading request.

An identifier sent by the first terminal is received.

Authorization check for the first terminal is performed on a server according to the identifier responsive to receiving the identifier sent by the first terminal.

The access class information is returned to the first terminal when the first terminal passes the authorization check.

In order to better describe the process in which the first terminal obtains the access class information of the second terminal, the following descriptions are made with the first terminal as a destination terminal and the second terminal as a broadcasting terminal in combination with FIG. 5.

The destination terminal obtains the access class information of the broadcasting terminal, which includes the following steps.

At step S100, the destination terminal sends an access class information reading request to the broadcasting terminal.

At step S101, the broadcasting terminal sends an identity authentication request to the destination terminal after receiving the access class information reading request sent by the destination terminal.

At step S102, the destination terminal feeds an identifier (ID) of the destination terminal back to the broadcasting terminal after receiving the identity authentication request sent by the broadcasting terminal.

At step S103, the broadcasting terminal initiates an authorization check for the destination terminal to a server after receiving the identifier fed back by the destination terminal.

At step S104, if the destination terminal is already authorized, the server feeds authorization check confirmation information back to the broadcasting terminal.

At step S105, the broadcasting terminal returns the access class information to the destination terminal after receiving the authorization check confirmation information fed back by the server.

In certain embodiments, the access class information includes at least one access class information of high priority.

In certain embodiments, a terminal with an access class of high priority may send a service restriction instruction. Such a terminal may be referred to as "D2D infrastructure" in D2D communication. The access class of the D2D infrastructure may be pre-agreed, for example, as class 12 (security department application), or may be designated as any one or more of the high priorities 11-15.

In an embodiment, before sending the service restriction instruction to the first terminal, the process further includes the followings.

An access class information modification instruction, sent by a server, is received.

The access class information is modified according to the access class information modification instruction sent by the server.

In certain embodiments, the second terminal may directly modify the access class information after receiving the access class information modification instruction sent by the server.

For example, the second terminal originally has only one low priority (access classes 0-9). Since only the terminal with the access class of high priority can send the service restriction instruction, the second terminal may be designated as class 14 (emergency service) by the server so that the second terminal may send the service restriction instruction to the first terminal.

In the device-to-device service restriction method of the embodiment of the present disclosure, the function corresponding to the first terminal is restricted according to the service restriction instruction sent by the second terminal. In a scenario where a service of a terminal needs to be restricted, information security of a security zone is guaranteed and user experiences are improved.

EXAMPLE IV

Figure 4:
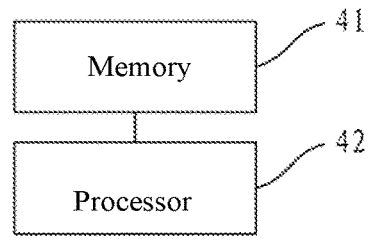
FIG. 4 is a structural schematic diagram of a second terminal according to a certain embodiments of the present disclosure.

As shown in FIG. 4, certain embodiments of the present disclosure provides a second terminal. The second terminal includes a memory 41, a processor 42, and a device-to-device service restriction program stored on the memory 41 and run on the processor 42. The device-to-device service restriction program is executed by the processor 42 to perform the steps in the following device-to-device service restriction method.

A service restriction instruction is sent to a first terminal. When the first terminal receives the service restriction instruction, access class information is sent to the first terminal. On this condition, the first terminal determines whether a service restriction authority of the second terminal is correct according to the access class information. A function corresponding to the first terminal is restricted according to the service restriction instruction when the service restriction authority of the second terminal is correct.

The device-to-device service restriction program may also be executed to perform the steps, in the following device-to-device service restriction method, by the processor 42.

An access class information reading request, sent by the first terminal, is received.

An identity authentication request is sent to the first terminal when receiving the access class information reading request.

An identifier sent by the first terminal is received.

Authorization check for the first terminal is performed on a server according to the identifier responsive to receiving the identifier.

The access class information is returned to the first terminal when the first terminal passes the authorization check.

The device-to-device service restriction program may also be executed by the processor 42 to perform the steps in the following device-to-device service restriction method:

the access class information contains at least one access class information of high priority.

The device-to-device service restriction program may also be executed by the processor 42 to perform the steps in the following device-to-device service restriction method.

The access class information modification instruction, sent by the server, is received.

The access class information is modified according to the access class information modification instruction sent by the server.

In the embodiment of the present disclosure, the function corresponding to the first terminal is restricted according to the service restriction instruction sent by the second terminal In a scenario where a service of a terminal needs to be restricted, information security of a security zone is guaranteed and user experiences are improved.

EXAMPLE V

Certain embodiments of the present disclosure provides a computer readable storage medium storing a device-to-device service restriction program. The device-to-device service restriction program may be executed by a processor to perform the steps in the device-to-device service restriction method of certain embodiments, such as those discussed above in Example I or Example III.

It is noted that the computer readable storage medium in certain embodiments has the same concept as the method of certain embodiments, such as those discussed above in Example I or Example III, and therefore its specific implementation process may be referred to the method embodiments. Further, the technical features in the method of certain embodiments are all correspondingly applicable in the embodiments in Example V and are thus not repeated herein.

In some embodiments of the present disclosure, the computer readable storage medium restricts the function corresponding to the first terminal according to the service restriction instruction sent by the second terminal. In a scenario where a service of a terminal needs to be restricted, information security of a security zone is guaranteed and user experiences are improved.

Those having ordinary skill in the art may understand that all or part of functional modules/units in the steps, system and apparatus in the above disclosed methods may be implemented as software, hardware or an appropriate combination thereof. In the hardware implementation, the division of the functional modules/units mentioned in the above descriptions does not necessarily correspond to the division of physical components. For example, one physical component may have several functions, or one function or step may be implemented cooperatively by several physical components. Some or all of the physical components may be implemented as software executable by a processor such as a central processor, a digital signal processor or a microprocessor or implemented as hardware, or implemented as an integrated circuit, for example, an application-specific integrated circuit. Such software may be distributed on the computer readable storage medium including a computer storage medium (or non-transitory medium) and a communication medium (or a transitory medium). As known by those having ordinary skill in the art, the term "the computer storage medium" includes volatile or non-volatile, removable and non-removable medium implemented in any technology or method for storing information (e.g. computer readable instructions, data structure, program module or other data). The computer storage medium includes but not limited to random access memory (RAM), read only memory (ROM), Electrically Erasable Programmable Read-Only Memory (EEPROM), flash memory or other memory technologies, CD-ROM, digital versatile disk (DVD) or other compact disk storage, magnetic cartridge, magnetic tape, magnetic disk storage or other magnetic storage device, or any another medium storing desired information and accessible by a computer. Further, it is well known to those skilled in the art that the communication medium usually includes computer readable instruction, data structure, program module or other data in modulated data signals of carrier or other transmission mechanism or the like and may also include any information transmission medium.

The above descriptions are made to the preferred embodiments of the present disclosure with reference to the accompanying drawings and shall not be intended to limit the scope of the claims of the present disclosure. Any modifications, equivalent substitutions and improvements made by those having ordinary skill in the art without departing from the scope and essence of the present disclosure shall all fall within the scope of protection of the present disclosure.

What is claimed is:

1. A device-to-device service restriction method, being applicable to a first terminal and comprising: receiving a service restriction instruction sent by a second terminal; obtaining access class information of the second terminal in response to receiving the service restriction instruction sent by the second terminal; determining whether a service restriction authority of the second terminal is correct according to the access class information of the second terminal; and restricting a function of the first terminal according to the service restriction instruction sent by the second terminal in response to the service restriction authority of the second terminal is correct.

2. The method according to claim 1, wherein the obtaining access class information of the second terminal comprises:
   sending an access class information reading request to the second terminal;
   in response to receiving an identity authentication request sent by the second terminal, sending an identifier to the second terminal, so that the second terminal initiates an authorization check for the first terminal to a server according to the identifier; and
   receiving the access class information returned by the second terminal.

3. The method according to claim 1, wherein the determining whether the service restriction authority of the second terminal is correct according to the access class information of the second terminal comprises:
   In response to the access class information of the second terminal including at least one access class information of high priority, determining that the service restriction authority of the second terminal is correct.

4. A device-to-device service restriction method, being applicable to a second terminal and comprising:
   sending a service restriction instruction to a first terminal; and in response to the first terminal receiving the service restriction instruction, sending access class information to the first terminal,
   the access class information enabling the first terminal to determine whether a service restriction authority of the second terminal is correct according to the access class information of the second terminal so that the first terminal restricts a function of the first terminal according to the service restriction instruction in response to the service restriction authority of the second terminal is correct.

5. The method according to claim 4, wherein the sending access class information to the first terminal comprises:

receiving an access class information reading request sent by the first terminal;

in response to receiving the access class information reading request, sending an identity authentication request to the first terminal;

receiving an identifier sent by the first terminal;

in response to receiving the identifier sent by the first terminal, performing authorization check for the first terminal on a server according to the identifier; and returning the access class information to the first terminal, in response to that the first terminal passes the authorization check.

6. The method according to claim 4, wherein the access class information comprises at least one access class information of high priority.

7. The method according to claim 4, wherein before sending the service restriction instruction to the first terminal, the method further comprises:

receiving an access class information modification instruction sent by the server; and modifying the access class information according to the access class information modification instruction sent by the server.

8. A non-transitory computer readable storage medium, wherein the computer readable storage medium stores a device-to-device service restriction program wherein, the device-to-device service restriction program, when executed by a first processor at a first terminal, causes the first processor to perform a first device-to-device service restriction method, the first device-to-device service restriction method comprising:

receiving a service restriction instruction sent by a second terminal;

obtaining access class information of the second terminal in response to receiving the service restriction instruction sent by the second terminal;

determining whether a service restriction authority of the second terminal is correct according to the access class information of the second terminal; and restricting a function of the first terminal according to the service restriction instruction sent by the second terminal in response to the service restriction authority of the second terminal is correct; wherein, the device-to-device service restriction program, when executed by a second processor at the second terminal, causes the second processor to perform a second device-to-device service restriction method, the second device-to-device service restriction method comprising:

sending a service restriction instruction to the first terminal; and in response to the first terminal receiving the service restriction instruction, sending access class information to the first terminal, the access class information enabling the first terminal to determine whether a service restriction authority of the second terminal is correct according to the access class information of the second terminal so that the first terminal restricts a functionof the first terminal according to the service restriction instruction in response to the service restriction authority of the second terminal is correct.

9. The non-transitory computer readable storage medium according to claim 8, wherein obtaining access class information of the second terminal comprises:

sending an access class information reading request to the second terminal;

in response to receiving an identity authentication request sent by the second terminal, sending an identifier to the second terminal, so that the second terminal originates authorization check for the first terminal to a server according to the identifier; and receiving the access class information returned by the second terminal.

10. The non-transitory computer readable storage medium according to claim 8, wherein determining whether the service restriction authority of the second terminal is correct according to the access class information of the second terminal comprises:

when the access class information of the second terminal includes at least one access class information of high priority, determining that the service restriction authority of the second terminal is correct.

11. The non-transitory computer readable storage medium according to claim 8, wherein sending access class information to the first terminal comprises:

receiving an access class information reading request sent by the first terminal;

in response to receiving the access class information reading request, sending an identity authentication request to the first terminal;

receiving an identifier sent by the first terminal;

in response to receiving the identifier sent by the first terminal, performing authorization check for the first terminal on a server according to the identifier; and returning the access class information to the first terminal, in response to that the first terminal passes the authorization check.

12. The non-transitory computer readable storage medium according to claim 8, wherein accessing class information comprises at least one access class information of high priority.

13. The non-transitory computer readable storage medium according to claim 8, wherein before sending the service restriction instruction to the first terminal, the second method further comprises:

receiving an access class information modification instruction sent by a server; and modifying the access class information according to the access class information modification instruction sent by the server.

* * * * *